United States Patent [19]

Grot

[11] 3,784,399

[45] Jan. 8, 1974

[54] FILMS OF FLUORINATED POLYMER CONTAINING SULFONYL GROUPS WITH ONE SURFACE IN THE SULFONAMIDE OR SULFONAMIDE SALT FORM AND A PROCESS FOR PREPARING SUCH

[75] Inventor: Walther Gustav Grot, Chadds Ford, Pa.

[73] Assignee: E. I. du Pont de Nemours and Company, Wilmington, Del.

[22] Filed: Sept. 8, 1971

[21] Appl. No.: 178,782

[52] U.S. Cl.................. 117/62.1, 117/68, 117/94, 117/95, 117/118, 117/138.8 UF, 260/96 R, 260/79.3 M, 260/79.3 MU, 210/500
[51] Int. Cl.............................................. C08h 19/00
[58] Field of Search.................. 117/118, 138.8 UF, 117/62.1, 68, 94, 95; 260/96 R, 79.3 M, 79.3 MU; 210/500

[56] References Cited
UNITED STATES PATENTS
3,282,875    11/1966    Connolly et al............ 260/79.3 MU Primary Examiner—William D. Martin
Assistant Examiner—Janyce A. Bell
Attorney—Theodore C. Gregory

[57] ABSTRACT

A film useful as an ion exchange membrane of fluorinated polymer containing pendant side chains containing sulfonyl groups which are attached to carbon atoms which have at least one fluorine atom attached thereto; one surface of the film having a majority of the sulfonyl groups of the polymer in the $-(SO_2NH)_mQ$ form wherein Q is H, $NH_4$, cation of an alkali metal and/or cation of alkaline earth metal and m is the valence of Q and the other surface of the film having the sulfonyl groups in the $-(SO_3)_n$Me form wherein Me is a cation and n is the valence of the cation and processes for preparing the film.

17 Claims, No Drawings

FILMS OF FLUORINATED POLYMER CONTAINING SULFONYL GROUPS WITH ONE SURFACE IN THE SULFONAMIDE OR SULFONAMIDE SALT FORM AND A PROCESS FOR PREPARING SUCH

This invention relates to fluorinated polymer containing pendant side chains containing sulfonyl groups which are attached to carbon atoms which have at least one fluorine atom attached thereto. Particularly, this invention relates to a film of the fluorinated polymer wherein one surface of the film has a majority of the sulfonyl groups of the polymer in the $-(SO_2NH)_mQ$ form wherein Q is H, $NH_4$, cation of an alkali metal, and/or cation of an alkaline earth metal and m is the valence of Q (hereinafter the sulfonamide/salt form) while the other surface is in the nonsulfonamide/salt form.

It was known that sulfonyl groups of perfluorocarbon polymers containing side chains containing sulfonyl groups could be converted into the $-SO_2NH_2$ form by contact with ammonia. A film was sought which was more electrically conductive than a film of such polymer yet would have its high selectivity for ion exchange purposes.

Such a film has been found. It is a film of fluorinated polymer containing pendant side chains containing sulfonyl groups, said sulfonyl groups being attached to carbon atoms which have at least one fluorine atom attached thereto; one surface of the film having a majority of the sulfonyl groups of the polymer in the $-(SO_2NH)_mQ$ form wherein Q is selected from the class consisting of H, $NH_4$, cation of an alkali metal, and cation of an alkaline earth metal and m is the valence of Q and the other surface of the film having the sulfonyl groups of the polymer comprising the $-(SO_3)_nMe$ form wherein Me is a cation and n is the valence of the cation with the proviso that when Me is H, Q is H. This film is useful as an ion exchange membrane.

A normal intermediate for the above film is a film of fluorinated polymer containing pendant side chains containing sulfonyl groups, said sulfonyl groups being attached to carbon atoms which have at least one fluorine atom attached thereto; one surface of the film having a majority of the sulfonyl groups in the polymer in the $-(SO_2NH)_mQ$ form, as above, and the other surface of the film having the sulfonyl groups of the polymer comprising the $-SO_2M$ form wherein M is a halogen atom.

As used herein, alkaline earth metal includes magnesium. Fluorinated and perfluorinated as used throughout the claims and specification includes compounds in which there are ether linkages.

To be useful as an ion exchange membrane, the film must be conductive. Conductivity is a function of the ability of the polymer to form ions. The nonsulfonamide/salt surface of the film is either in the ionic form or in the acid form which readily forms ions. The sulfonamide/salt surface when in the sulfonamide salt form is conductive. When Q is H in the sulfonamide/salt surface, the nitrogen-hydrogen bond of the $-SO_2NH_2$ must have a pK of from 3 to 8 in an aqueous medium. This level of pK is an indication of acidity and is the negative logarithm of the dissociation constant of the bond. This acidity is required in order that the sulfonamide surface of the film be conductive. The preferred pK is from 4 to 7.

The sulfonamide/salt surface is required on the film for the film to be selective for ion exchange purposes. This selectivity is a function of the conversion of the sulfonyl groups in the film to the sulfonamide or sulfonamide salt. It is stated above that the majority of the sulfonyl groups are in the $-(SO_2NH)_mQ$ form, i.e., sulfonamide/salt form. Normally, the film of this invention will have substantially all of the sulfonyl groups on one surface converted to the sulfonamide/salt form. This is normally more than 80 percent.

Selectivity is not a function of the thickness of the sulfonamide/salt surface of the film if the surface is at least about 200 Angstroms thick. The thickness of the surface is normally from about 0.01 percent of the film to 80 percent of the film thickness. Preferably, the sulfonamide/salt surface is from 0.1 to 10 percent of the film.

The film of this invention is a fluorinated polymer containing pendant side chains containing sulfonyl groups. The polymers are prepared from monomers which are fluorinated or fluorine substituted vinyl compounds. The polymers are made from at least two monomers with at least one of the monomers coming from each of the two groups described below. The first group is fluorinated vinyl compounds such as vinyl fluoride, hexafluoropropylene, vinylidene fluoride, trifluoroethylene, chlorotrifluoroethylene, perfluoro(alkyl vinyl ether), tetrafluoroethylene and mixtures thereof.

The second group is the sulfonyl-containing monomers containing the usual precursor $-SO_2F$. One example of such a comonomer is $CF_2=CFSO_2F$. Additional examples can be represented by the generic formula $CF_2=CFR_fSO_2F$ wherein $R_f$ is a bifunctional perfluorinated radical comprising 2 to 8 carbon atoms. The particular chemical content or structure of the radical linking the sulfonyl group to the copolymer chain is not critical but such must have a fluorine atom attached to the carbon atom to which is attached the sulfonyl group. If the sulfonyl group is attached directly to the chain, the carbon in the chain to which it is attached must have a fluorine atom attached to it. The $R_f$ radical of the formula above can be either branched or unbranched, i.e., straight chained and can have one or more ether linkages. It is preferred that the vinyl radical in this group of sulfonyl fluoride containing comonomers be joined to the $R_f$ group through an ether linkage, i.e., that the comonomer be of the formula $CF_2=CFOR_fSO_2F$. Illustrative of such sulfonyl fluoride containing comonomers are $CF_2=CFOCF_2CF_2SO_2F$,

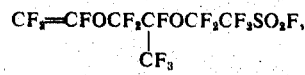

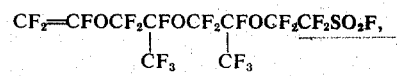

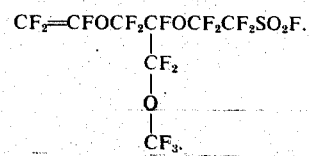

The most preferred sulfonyl fluoride containing comonomer is perfluoro(3,6-dioxa-4-methyl-7-octenesulfonyl fluoride),

The sulfonyl-containing monomers are disclosed in such references as U. S. Pat. No. 3,282,875 to Connolly et al. and U. S. Pat. No. 3,041,317 to Gibbs et al. and in U.S. patent application Ser. No. 779,273, to Grot and in U. S. patent application Ser. No. 779,235 to Resnick, both filed on Nov. 26, 1968.

The preferred copolymers utilized in the film are perfluorocarbon although others can be utilized as long as there is a fluorine atom attached to the carbon atom which is attached to the sulfonyl group of the polymer. The most preferred copolymer is a copolymer of tetrafluoroethylene and perfluoro(3,6-dioxa-4-methyl-7-octenesulfonyl fluoride) which comprises 10 to 60 percent, preferably, 25 to 50 percent by weight of the latter.

The copolymer used in the percent invention is prepared by general polymerization techniques developed for homo- and copolymerizations of fluorinated ethylenes, particularly those employed for tetrafluoroethylene which are described in the literature. Nonaqueous techniques for preparing the copolymers of the present invention include that of U. S. Pat. No. 3,041,317, issued to H. H. Gibbs and R. N. Griffin on June 26, 1962, that is, by the polymerization of a mixture of the major monomer therein, such as tetrafluoroethylene, and a fluorinated ethylene containing sulfonyl fluoride in the presence of a free radical initiator, preferably a perfluorocarbon peroxide or azo compound, at a temperature in the range 0° - 200° C. and at pressures in the range 1 - 200, or more, atmospheres. The nonaqueous polymerization may, if desired, be carried out in the presence of a fluorinated solvent. Suitable fluorinated solvents are inert, liquid, perfluorinated hydrocarbons, such as perfluoromethylcyclohexane, perfluorodimethylcyclobutane, perfluorooctane, perfluorobenzene, and the like.

Aqueous techniques for preparing the copolymer of this invention include contacting the monomers with an aqueous medium containing a free-radical initiator to obtain a slurry of polymer particles in non-water-wet or granular form, as disclosed in U. S. Pat. No. 2,392,967, issued to M. M. Brubaker on Feb. 5, 1946; or contacting the monomers with an aqueous medium containing both a free-radical initiator and a telogenically inactive dispersing agent, to obtain an aqueous colloidal dispersion of polymer particles, and coagulating the dispersion, as disclosed, for example, in U.S. Pat. No. 2,559,752, issued to K. L. Berry on July 10, 1951, and U. S. Pat. No. 2,593,583, issued to J. F. Lontz on Apr. 22, 1952.

The surface of the film which is in the sulfonamide/salt form is preferably in the sulfonamide form, i.e., Q is H and m is 1, the group formula being —$SO_2NH_2$. If the surface is in the sulfonamide salt form, Q is preferably $NH_4$ and/or a cation of an alkali metal, in particular, K or Na while M is 1 with Na being most preferred. The preferred cation of an alkaline earth metal is Ca.

The surface of the film which is not in the sulfonamide/salt form is in the —$(SO_3)_n$Me form. Me is normally K, Ca, Cu, Na, and/or H with K, Na, and H being preferred. If Me is H, it is required that the sulfonamide/salt surface be the sulfonamide, i.e., Q be H or the polymer is not stable.

In the intermediate film, i.e., the film wherein the surface is not the sulfonamide/salt surface is in the —$SO_2M$ form where M is halogen, M is preferably F or Cl, the former being most preferred. The preferreds for the surface which is in the sulfonamide/salt form are as stated above for the ion exchange membrane. This film is converted to the ion exchange membrane. One method of accomplishing this is by contacting the entire film with $Ma(OH)_p$ wherein p is the valence of Ma which is Q as described above except H is not included. This converts the surface of the film which is in the —$SO_2M$ form to the —$(SO_3)_n$ Me form wherein Me is Ma. If the sulfonamide/salt surface is in the sulfonamide form it will be converted to the salt form where Q is Ma. Ma is preferably Ca, K, Na, or $NH_4$. The most preferred are K or Na. If the —$SO_2OH$ form on the other than sulfonamide/salt surface is to be prepared., the salts described above are converted by the use of an acid such as hydrochloric, sulfuric, or nitric. This also converts the salt on the sulfonamide/salt surface if it is the sulfonamide salt to the sulfonamide. To prepare films with the surface which is not in the sulfonamide/salt form in the salt form of cations which form weaker bases than those of Ma, the above procedure is followed with the additional step of ion exchange of the cation with the acid form, i.e., the —$SO_2OH$. The copper salt can be prepared in such a manner.

Preparation of the intermediate film normally begins with the fluorinated polymer which contains sulfonyl groups in the form of —$SO_2F$. These groups are converted on one surface to the sulfonamide (—$SO_2NH_2$) by contacting that surface with anhydrous ammonia which can be in the gaseous form, the liquid form, as a mixture with air or other gas which will not react with the sulfonyl group or the rest of the polymer, or ammonia in a solvent which is nonaqueous and which is nonreactive with the polymer such as dimethyl sulfoxide. The contact time will vary according to the thickness of sulfonamide surface desired. For gaseous mixtures of ammonia and air, the time can be as much as about 24 hours while with liquid ammonia the contact time will normally be less than 10 hours preferably less than three hours. If the gaseous form is utilized, the temperature during contact will normally be about room temperature, i.e., from 20° to 30° C. whereas if liquid ammonia is the contact media, the temperature will normally be less than —33° C. at atmospheric pressure but can be higher if pressures above atmospheric are used. If the salts of the sulfonamide are desired, the treatment described above can be used on the sulfonamide surface.

The above describes the conversion from the halogen sulfonyl group to the sulfonamide or sulfonamide salts. If the film is in the —$(SO_3)_n$Me form prior to its partial conversion to the sulfonamide or sulfonamide salt it is necessary to convert at least the sulfonyl groups of one surface of the film which are in the $-(SO_3)_nMe$ form to the halogen form, i.e., $-SO_2M$ before converting to the sulfonamide as is described above using anhydrous ammonia. If only one surface of the film is converted to the halogen form and then this is converted to the sulfonamide or its salts, no further conversion is necessary to obtain the ion exchange membrane. However, if the entire film is converted to the halogen form then reconversion of the part that is not sulfonamide is normally required. The procedure discussed above for the conversion to the $-(SO_3)_nMe$ form can be utilized for such.

The film may be prepared by pressing the fluorinated polymer at from 250 to 40,000 psig or can be prepared by extrusion. Normally, during the pressing step the polymer will be in the $-SO_2M$ form wherein M is preferably F. The films normally are from 0.002 to 0.02 inch in thickness.

The ion exchange membrane is useful as a membrane for ion exchange uses particularly where it is necessary to have an acidic membrane in a basic solution such as in a chloroalkali cell. The membrane can be the film itself or can be the film reinforced with cloth such as cloth of tetrafluoroethylene polymer. The intermediate film in which the surface of the other than the sulfonamide surface is in the $-SO_2M$ form where M is halogen, is useful in preparing the above ion exchange membrane.

The following Examples are meant to illustrate but not to limit the invention. All parts and percentages are by weight unless specified otherwise. In the Example, per-selectivity is measured according to the description in the third paragraph on page 636 of the *Encyclopedia of Polymer Science and Technology*, Vol. 8, John Wiley & Sons, Inc., 1968.

EXAMPLE

A blown film in the form of tubing made from a copolymer of tetrafluoroethylene and

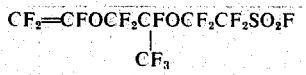

(mole ratio of the former to the latter is 7:1) was inflated with a mixture of air and approximately 1 percent by volume ammonia gas at room temperature. The tubing had a circumference of 18 inches and a wall thickness of 0.004 inch. The ends were clamped to prevent the escape of the inflating gas mixture. After 15 hours approximately 0.001 inch out of the total thickness of 0.004 inch was converted to the $-SO_2NH_2$ form. This amount of conversion was indicated by staining of the sample and observing the variation in the stain. The tube was deflated and immersed in a 10 percent solution of sodium hydroxide at 90° C. for 48 hours. This converted the $-SO_2NH_2$ of one surface to the $-SO_2NH^-Na^+$ form and the other surface which was approximately 0.003 inch of the total of 0.004 inch to the $-(SO_3^-)Na^+$ form.

The permselectivity of this sample when exposed to 3N KCl solution on the $-(SO_2NH^-)$ $Na^+$ surface and 1N KCl solution on the other surface was 73 percent as compared to 58 percent for a sample that had not been treated with ammonia.

An electrolysis cell was constructed and consisted of a graphite chamber which served as the anode and endplate, two silicon rubber spacers which served as gaskets to seal a stainless steel wire screen cathode between them and a tetrafluoroethylene polymer endplate. The membrane sample to be tested was placed between the graphite chamber and the first spacer with the sulfonamide salt $(-SO_2NH^-Na^+)$ surface facing the cathode. Suitable outlets were provided in both the endplates for the electroylte. A saturated brine of NaCl (26 percent by weight) was circulated through both compartments of the cell separately while passing an electric current through the cell. The amount of sodium hydroxide produced was determined by titration of the samples taken periodically from the effluent of the cathode department. The current efficiency was expressed as the percentage of sodium hydroxide produced compared to the theoretical amount that the current passed through the cell should have produced. The current efficiency of the membrane with the sulfonamide/salt surface was 98 percent while the current efficiency for a sample without such a surface was 83 percent.

I claim:

1. A film of fluorinated polymer containing pendant side chains containing sulfonyl groups, said sulfonyl groups being attached to carbon atoms which have at least one fluorine atom attached thereto; one surface of the film having a majority of the sulfonyl grops of the polymer in the $-(SO_2NH)_mQ$ form wherein Q is selected from the class consisting of H, $NH_4$, cation of an alkali metal, and cation of an alkaline earth metal and m is the valence of Q and the other surface of the film having the sulfonyl groups of the polymer comprising the $-(SO_3)_nMe$ form wherein Me is a cation and n is the valence of the cation with the proviso that when Me is H, Q is H.

2. The film of claim 1 in which the polymer is perfluorinated.

3. The film of claim 2 wherein the cation of the alkali metal of Q is K or Na and the cation of the alkaline earth metal of Q is Ca.

4. The film of claim 3 wherein Me is selected from the class consisting of K, Na, H, Ca and Cu.

5. The film of claim 4 wherein Q is H, Me is H, m is 1, n is 1, and the surface of the film having a majority of the sulfonyl groups of the polymer in the $-(SO_2NH)_m$ Q form is from 0.01 to 80 percent of the thickness of the film.

6. The film of claim 4 wherein Q is Na, Me is Na, $m$ is 1, $n$ is 1, and the surface of the film having a majority of the sulfonyl groups of the polymer in the $-(SO_2NH)_mQ$ form is from 0.01 to 80 percent of the thickness of the film.

7. A film of fluorinated polymer containing pendant side chains containing sulfonyl groups, said sulfonyl groups being attached to carbon atoms which have at least one fluorine atom attached thereto; one surface of the film having a majority of the sulfonyl groups in the polymer in the $-(SO_2NH)_m$ Q form wherein Q is selected from the class consisting of H, $NH_4$, cation of an alkali metal and cation of an alkaline earth metal and m is the valence of Q, and the other surface of the film having the sulfonyl groups of the polymer comprising the $-SO_2M$ form wherein M is a halogen atom.

8. The film of claim 7 in which the polymer is perfluorinated.

9. The film of claim 8 wherein M is F.

10. The film of claim 9 wherein the cation of the alkali metal of Q is K or Na and the cation of the alkaline earth metal of Q is Ca.

11. The film of claim 10 wherein Q is H, m is 1, and the surface of the film having a majority of the sulfonyl groups of the polymer in the $-SO_2NH)_mQ$ form is from 0.01 to 80 percent of the thickness of the film.

12. The film of claim 10 wherein Q is Na, m is 1, and the surface of the film having a majority of the sulfonyl groups of the polymer in the $-(SO_2NH)_mQ$ form is from 0.01 to 80 percent of the thickness of the film.

13. A process for the preparation of an ion exchange membrane which comprises contacting one surface of a film of a fluorinated polymer containing pendant side chains containing sulfonyl groups, said sulfonyl groups being attached to carbon atoms which have at least one fluorine atom attached thereto and being in the $-SO_2M$ form wherein M is a halogen atom, with anhydrous ammonia so that a majority of the sulfonyl groups on said surface of said film are converted to the $-SO_2NH_2$ form, said surface comprising from 0.01 to 80 percent of the thickness of the film; removing the film from the contact with the anhydrous ammonia; and contacting the film with $Ma(OH)_p$, wherin Ma is selected from the group consisting of $NH_4$, cation of an alkali metal and cation of an alkaline earth metal and is the valence of Ma.

14. The process of claim 13 with the additional step of contacting the film with acid.

15. The process of claim 14 with the additional step of contacting the film with cation.

16. The film of claim 1 wherein Q and Me are identical.

17. The film of claim 1 wherein Q is H.

* * * * *